(No Model.)
L. F. KEPLER.
PRICE SCALE.
No. 514,475.  Patented Feb. 13, 1894.
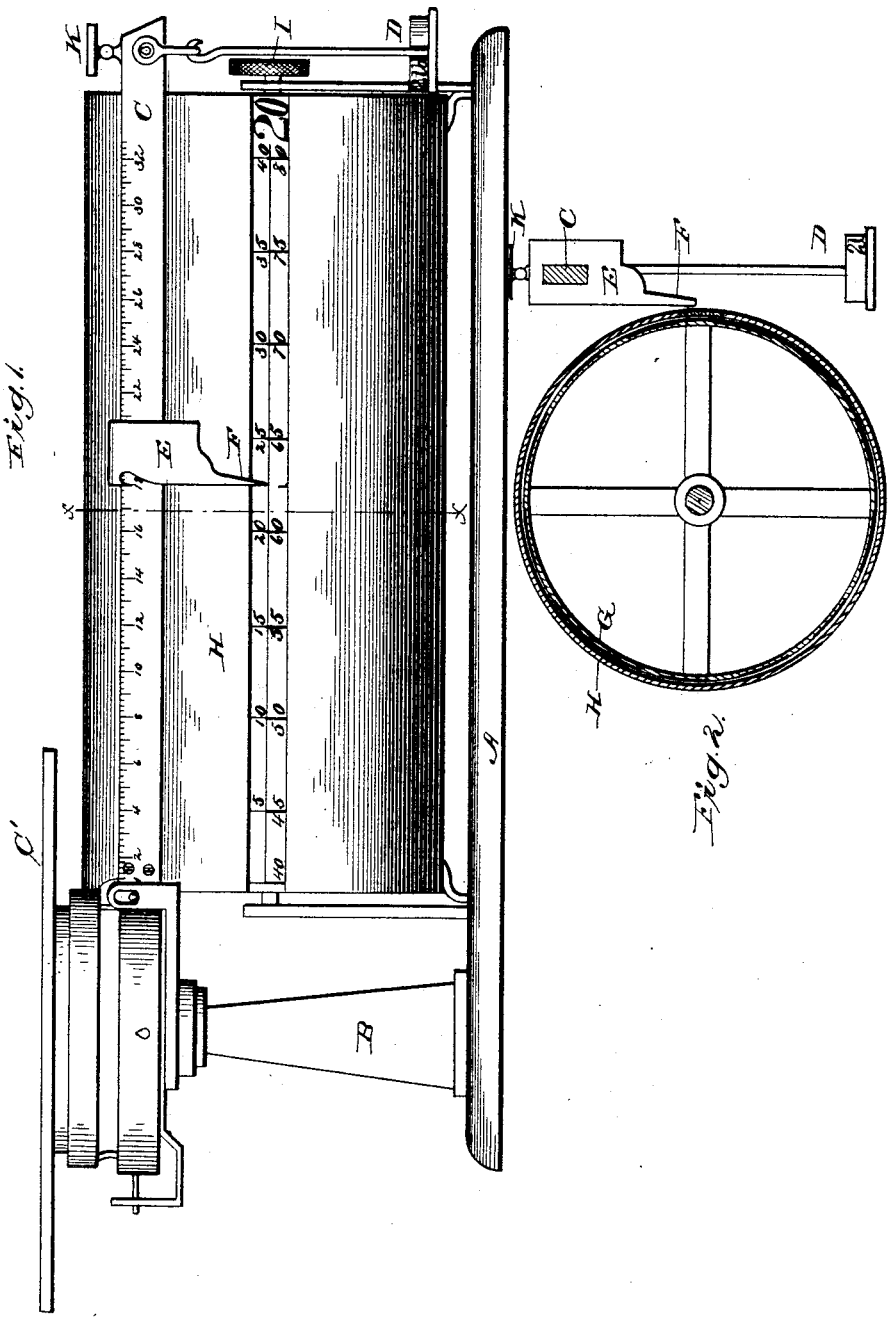
WITNESSES
J. M. Fowler Jr.
Aley Stewart
INVENTOR
Lutie F. Kepler
by Church Church
his Attorneys

UNITED STATES PATENT OFFICE.

LUTIE FLORENCE KEPLER, OF DAYTON, OHIO.

PRICE-SCALE.

SPECIFICATION forming part of Letters Patent No. 514,475, dated February 13, 1894.

Application filed May 19, 1893. Serial No. 474,770. (No model.)

*To all whom it may concern:*

Be it known that I, LUTIE FLORENCE KEPLER, of Dayton, in the county of Montgomery and State of Ohio, have invented certain new and useful Improvements in Price-Scales; and I do hereby declare the following to be a full, clear, and exact description of the same, reference being had to the accompanying drawings, forming a part of this specification, and to the letters of reference marked thereon.

This invention relates to improvements in that class of scales, usually even balanced scales, with which a balance weight or sliding poise is employed with a graduated beam to indicate the weight of the article placed on the platform, and a graduated price scale registering with a pointer on the poise and indicating the cost of the article, such price scale being usually movable and having a series of sets of graduations thereon, each set of graduations being computed at a different rate per unit, and it is the object of this invention to enlarge the capacity of such scales whereby the value of an article may be read instantly when its weight is greater than can be counterbalanced by the poise, thereby necessitating the use of a removable counterpoise.

Broadly then, the invention consists in the employment of a double set of graduations, corresponding to any one price per unit, one set indicating the value of an article when balanced by the poise alone, and the other set indicating the value of an article when balanced by the counterpoise plus the poise.

The invention consists further in certain novel details of construction and combinations and arrangements of parts all as will be now described and pointed out particularly in the appended claims.

Referring to the accompanying drawings: Figure 1 is a front elevation of a scale constructed in accordance with my present invention. Fig. 2 is a cross section on the line x—x.

Like letters of reference in both figures indicate the same parts.

The form of the balance scale illustrated, is well known, and needs no description further than to say that A indicates the base, B the standard having the bearings at the upper ends for the knife edge journals of the beam C, which latter carries at one end, a platform C' of usual construction, and at the other end, a pendant D for the accommodation of supplemental counterpoise weights. In addition, the beam is provided with the usual graduations, as shown, running from 1 to 32 and indicating ounces, and upon this end of the beam there is mounted a sliding poise weight E, the weight of which serves to balance any article placed on the platform and not exceeding in weight thirty-two ounces or two pounds. This poise E is provided with an indicating end or surface preferably in the form of a depending finger F and in proximity to this finger or in position for its indications to register therewith, preferably when the poise is depressed, is a movable scale for indicating the cost at a given rate per unit.

For convenience in permitting the use of a wide range in the unit cost of articles to be weighed, the price scales or indications are preferably marked on the surface of a cylinder G or otherwise applied thereto, and the cylinder G is journaled to rotate in bearings of any suitable character, either carried by the base in position to have the indications register with the poise pointer as before mentioned, or mounted upon and balanced up with the scale beam, both these constructions being well known. In the form shown, the cylinder is mounted in bearings supported from the base of the scale, and it is provided with an inclosing case or stationary cylinder H having in the front side a relatively narrow aperture extending from end to end, and covered with a glass or other transparent plate through which the scale or set of indications for any one unit price may be seen and read. These sets of indications, it will be noted are arranged longitudinally of the cylinder and at one end the rate per unit is preferably added, in large figures, as shown in the drawings, the rate at the opening is twenty cents per pound and the upper set of indications shown, gives the total cost in cents of any article which the poise is capable of balancing at this rate, thus for sixteen ounces it will be twenty cents, for twenty-four ounces, thirty cents.

Now, as so far described, the use of the price scale is absolutely limited to articles which can be balanced by the sliding poise weight, and if it is too heavy for this and a counterpoise has to be added to the pendant D, the dealer must needs go through with all the calculations before necessary and the price scale is of practically no use. In order to avoid this, I now provide a second set of indications for each unit price, such indications being also adapted to register with the pointer on the poise and to indicate the cost of the article which will be balanced by the counterpoise, plus the sliding poise, that is to say, this second set of price indications will begin with a sum equal to the value of the counterpoise placed on the pendant D and as the indications progress upward, the value of the sliding poise is added to them and marked on the cylinder. As shown, the counterpoise is supposed to indicate a valuation of forty cents, thus the second set of cost indications begins with 40 and as the values of the sliding poise runs from 0 to 40 the indications in the second set will run up to 80, and the intermediate indications will vary accordingly.

The illustration given in the drawings and heretofore described is an exceedingly simple one, and may be readily grasped, but it will be seen by those skilled in the art, that the saving in the computations where the price per unit runs into fractions will be very great, and by this construction a price scale of most simple form may be made having a very wide range of usefulness, as the price indications may be given for any weight within the capacity of the scales, thus a dealer is entirely relieved from making computations and a purchaser is absolutely sure that the total price for a given article at any rate per pound is correct.

In the preferred construction, the second set of indications for each series at a given rate per unit is made of a different color, usually red, and is located below the set of indications for the sliding poise alone and as a convenient means for changing the rate per unit the cylinder is provided with a knob or handle I, at one end for rotating it to the desired point.

In order that the pointer on the sliding poise may always be brought to the proper point or the same point relative to the indications on the cylinder, the beam is provided with a finger piece or button K at the outer end, which may be used to depress it to the limit of its movement after the article has been balanced by sliding the poise along and adding counterpoise weights as is found necessary, thus in weighing any article and obtaining its cost, the cylinder is turned until the proper rate per unit is exposed through the opening in the casing, then the article is balanced up in the usual manner and the operator pressing his finger on the button K brings the beam down until the pointer on the sliding poise shows exactly the total price of an article of that weight and at that given price per unit.

Having thus described my invention, what I claim as new is—

1. In a price scale, the combination with the platform, beam, poise sliding thereon and removable counterpoise, of the price indicating scale with which the sliding poise registers, having two sets of indications one indicating the cost of articles balanced by the sliding poise and the other indicating the cost of articles balanced by the removable counterpoise plus the sliding poise, substantially as described.

2. In a price scale, the combination with the platform, beam, poise sliding thereon and removable counterpoise, of the series of indicating scales with which the poise registers, to indicate the total cost at given rates per unit, the indications for each unit price consisting of two sets of indications, one indicating the cost of articles balanced by the sliding poise and the other the cost of articles balanced by the removable counterpoise plus the sliding poise; substantially as described.

3. In a price scale, the combination with the platform beam, poise sliding thereon and removable counterpoise, of the series of movable indicating scales with which the poise is adapted to register to indicate the total cost at given rates per unit, the indications for each unit price consisting of two sets of indications, one indicating the cost of articles balanced by the sliding poise and the other the cost of articles balanced by the removable counterpoise plus the sliding poise; substantially as described.

4. In a price scale, the combination with the platform, beam, sliding poise and removable counterpoise, of the rotary cylinder having the series of indications or scales with which the sliding poise registers, each of the indications of said series consisting of two sets one set indicating the cost of articles balanced by the sliding poise and the other set indicating the cost of articles balanced by sliding poise plus the counterpoise; substantially as described.

LUTIE FLORENCE KEPLER.

Witnesses:
D. D. DYIZ,
C. W. DUSTIN.